United States Patent [19]
Houlihan

[11] Patent Number: 5,467,324
[45] Date of Patent: Nov. 14, 1995

[54] WRISTWATCH RADIOTELEPHONE WITH DEPLOYABLE VOICE PORT

[75] Inventor: John T. Houlihan, Southbury, Conn.

[73] Assignee: Timex Corporation, Middlebury, Conn.

[21] Appl. No.: 344,224

[22] Filed: Nov. 23, 1994

[51] Int. Cl.⁶ ............................ G04B 47/00; H04M 1/03
[52] U.S. Cl. .............................. 368/10; 368/13; 379/90; 379/428
[58] Field of Search .................... 368/4, 10, 13, 368/47, 281, 282; 379/90, 428, 440

[56] References Cited

U.S. PATENT DOCUMENTS

| | | | |
|---|---|---|---|
| 3,032,651 | 5/1962 | Gisiger-Stahli et al. | 250/14 |
| 4,847,818 | 7/1989 | Olsen | 368/10 |
| 4,985,878 | 1/1991 | Yamada et al. | 368/88 |
| 5,008,864 | 4/1991 | Yoshitake | 368/10 |
| 5,214,623 | 5/1993 | Seager | 368/10 |
| 5,218,577 | 6/1993 | Seager | 368/10 |
| 5,224,076 | 6/1993 | Thorp | 368/10 |
| 5,228,012 | 7/1993 | Seager | 368/10 |
| 5,235,560 | 8/1993 | Seager | 368/10 |
| 5,235,561 | 8/1993 | Seager | 368/10 |
| 5,239,521 | 8/1993 | Blonder | 368/10 |
| 5,251,189 | 10/1993 | Thorp | 368/4 |
| 5,260,915 | 11/1993 | Houlihan | 368/10 |
| 5,274,613 | 12/1993 | Seager | 368/13 |
| 5,381,387 | 1/1995 | Blonder et al. | 368/10 |

FOREIGN PATENT DOCUMENTS 59-56586  4/1984  Japan ........................... G04C 21/02

*Primary Examiner*—Vit W. Miska
*Attorney, Agent, or Firm*—Fish & Neave; Robert R. Jackson

[57] ABSTRACT

A wristwatch radiotelephone is usable as a radiotelephone without the need to remove the apparatus from the user's wrist and without the need to plug any additional elements into the apparatus. During radiotelephone use, simultaneous placement of microphone and speaker ports adjacent the user's mouth and ear, respectively, is facilitated by having at least one of these ports deploy from the remainder of the apparatus to increase the distance between the two ports.

20 Claims, 8 Drawing Sheets

WRISTWATCH RADIOTELEPHONE WITH DEPLOYABLE VOICE PORT

BACKGROUND OF THE INVENTION

This invention relates to wristwatch radiotelephones, and more particularly to wristwatch radiotelephones which can be used as a radiotelephone without removing the apparatus from the user's wrist.

A number of wristwatch radiotelephone structures have been proposed. Some of these structures are intended to be wholly or partly removed from the user's wrist and held in his or her hand when the apparatus is to be used as a radiotelephone (see, for example, Olsen U.S. Pat. No. 4,847,818, Yoshitake U.S. Pat. No. 5,008,864, Seager U.S. Pat. Nos. 5,214,623, 5,218,577, 5,228,012, 5,235,560, 5,235,561, and 5,274,613, Thorp U.S. Pat. Nos. 5,224,076 and 5,251,189, and Houlihan U.S. Pat. No. 5,260,915). Others of these structures require the temporary addition of another component to the wristwatch for radiotelephone use (see, for example, Japanese patent document 59-56586 and FIGS. 8 and 9 of the above-mentioned Yoshitake patent). The reason these devices must be removed from the wrist and/or temporarily augmented by additional components is that, on the wrist and unaugmented, they tend to be too small to provide a microphone and a speaker that are sufficiently far apart to enable the microphone and speaker to be simultaneously placed near the user's mouth and ear, respectively. Thus many of the known structures are removed from the wrist so that they can be elongated to increase the linear distance between a microphone and a speaker. Alternatively or additionally, a remote speaker or a speaker extension is temporarily plugged into the wristwatch in order to provide sufficiently widely spaced input and output voice ports.

Some users of this type of equipment may find it inconvenient or undesirable to have to remove the wristwatch from the wrist in order to use it as a radiotelephone. It is also believed undesirable to require the temporary addition of another element to the wristwatch when radiotelephone use is desired. The additional element must somehow be carried separately from the wristwatch, and thus it may be more easily lost or damaged.

In view of the foregoing, it is an object of this invention to provide improved wristwatch radiotelephone apparatus.

It is a more particular object of this invention to provide wristwatch radiotelephone apparatus which can be conveniently used as a radiotelephone without requiring the user to remove the apparatus from his or her wrist, and without requiring the temporary addition of other elements to the apparatus.

SUMMARY OF THE INVENTION

These and other objects of the invention are accomplished in accordance with the principles of the invention by providing wristwatch radiotelephone apparatus having at least one voice port (i.e., the structure which receives the user's voice from his or her mouth, or the structure which delivers to the user's ear audible voice information produced by the apparatus from received radio signals) which is deployable from the remainder of the apparatus when radiotelephone use is desired. The deployable voice port is permanently attached to the wristwatch radiotelephone, but it is extendable from the apparatus when radiotelephone use is desired. This allows the apparatus to remain on the wrist while the deployable voice port is deployed to a position that is relatively far from the wrist. The deployable voice port can then be placed in or near the user's ear, while the other voice port is placed adjacent the user's mouth. Alternatively, the deployable voice port may be placed adjacent the user's mouth, while the other voice port is placed adjacent the user's ear.

Any of a wide variety of structures may be used for allowing selective deployment of the deployable voice port from the remainder of the apparatus. For example, the deployable voice port may be secured to the remainder of the apparatus by a flexible tether member that is alternately extendable from or retractable into the remainder of the apparatus. Other possibilities include mounting the deployable voice port on a telescoping and/or folding structure on the remainder of the apparatus.

Further features of the invention, its nature, and various advantages will be more apparent from the accompanying drawings and the following detailed description of the preferred embodiments.

BRIEF DESCRIPTION OF THE DRAWINGS

FIG. 4 shows some parts of the apparatus in two different operating conditions.

DETAILED DESCRIPTION OF THE PREFERRED EMBODIMENTS

Figure 1:
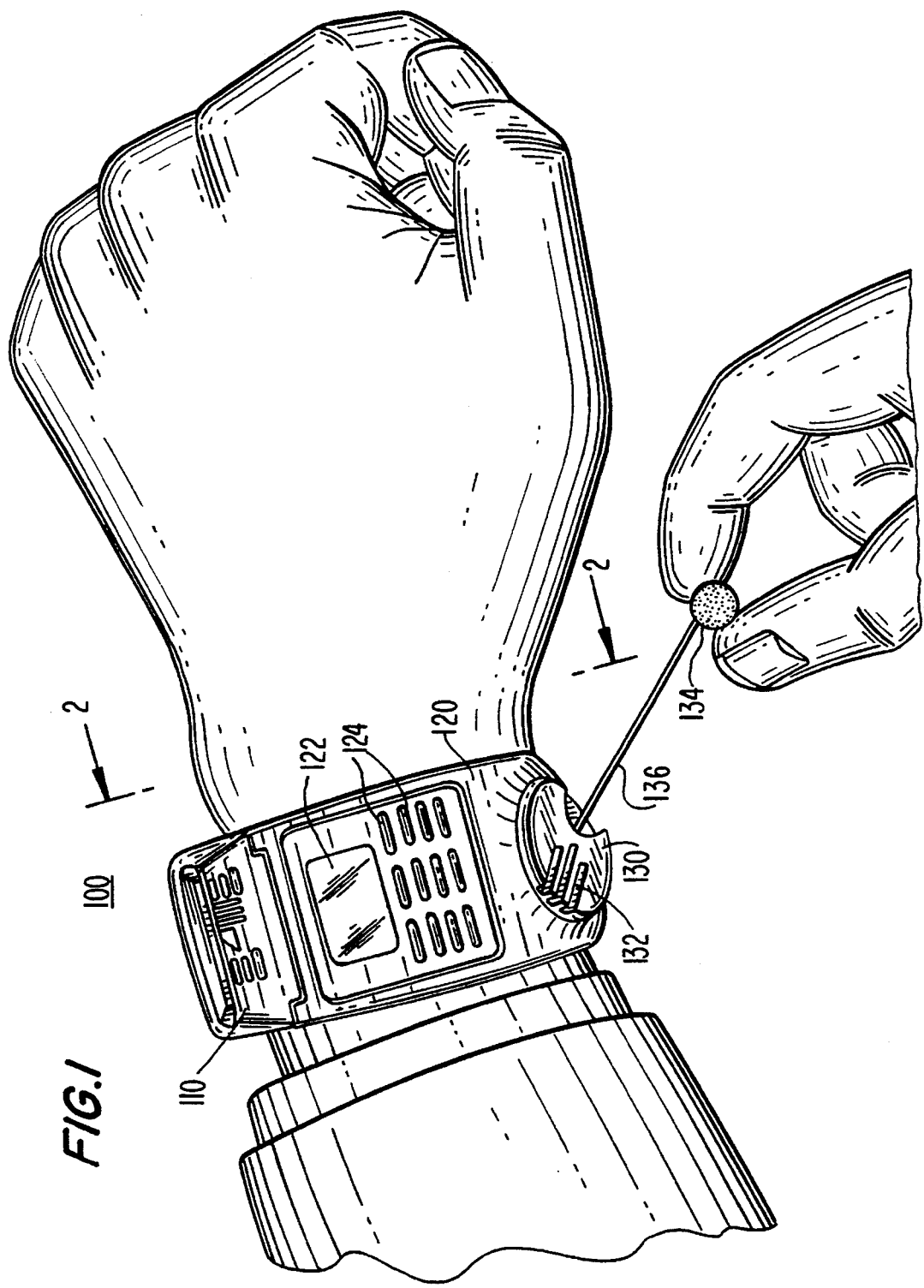
FIG. 1 is an elevational view of a first illustrative embodiment of a wristwatch radiotelephone constructed in accordance with this invention.
Figure 2:
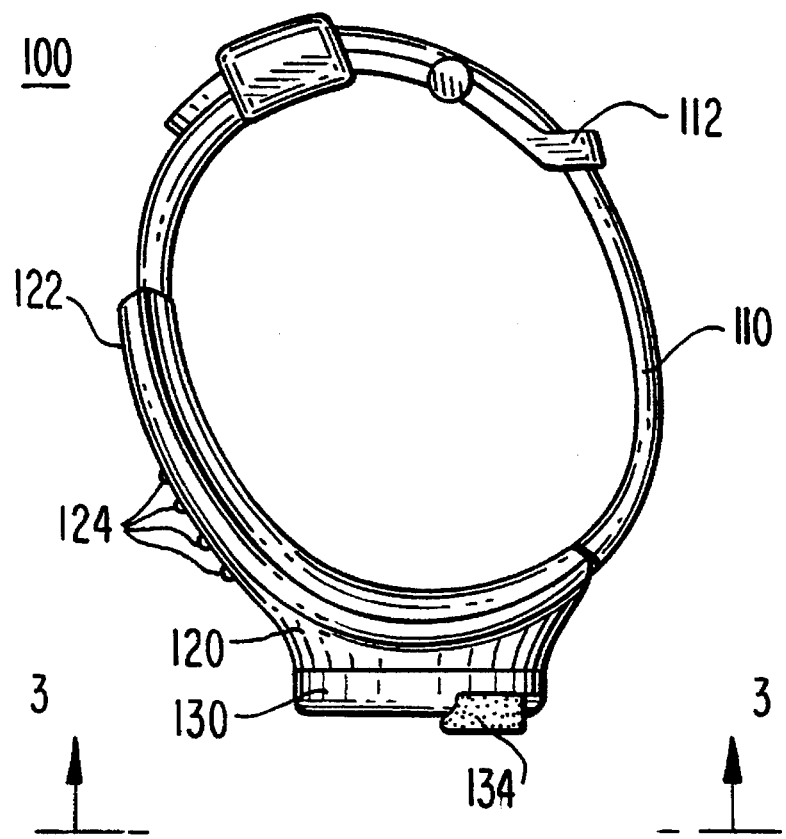
FIG. 2 is another elevational view of the apparatus of FIG. 1 taken generally along the line 2—2 in FIG. 1, but showing a different operating condition of the apparatus.
Figure 3:
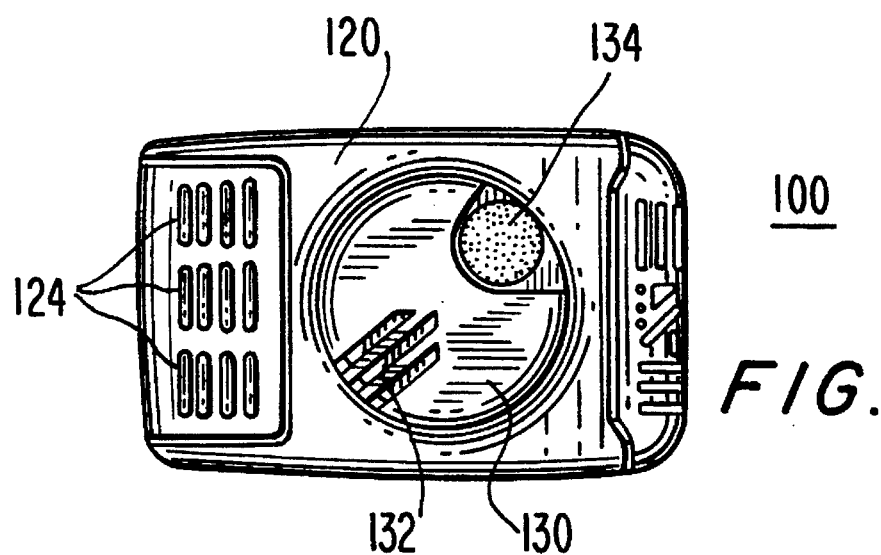
FIG. 3 is still another elevational view of the apparatus of FIGS. 1 and 2 taken along the line 3—3 in FIG. 2.

A first illustrative embodiment of the invention is shown in FIGS. 1–3. As shown in these FIGS., wristwatch radiotelephone 100 includes a strap structure 110 with a buckle 112 for releasably encircling a user's wrist. Although a particular type of strap structure is shown in FIGS. 1–3, it will be understood that any other type of strap structure can be used instead if desired. For example, the strap structure may be a resilient C-shape which grips the wrist without completely encircling it. Or the strap structure may be a resiliently expandable annular structure which can be slipped on or off over the hand without the necessity for buckling or unbuckling a buckle.

A combined wristwatch structure and radiotelephone structure 120 is disposed at one circumferential location along band structure 110. In this particular embodiment structure 120 is shown on what is frequently referred to as the "outside" of the user's wrist (i.e., adjacent the "back" of the user's hand). Structure 120 includes a display 122 (typically digital) for visibly displaying such information as the time of day, the day of the week, the date, the month, a telephone number being dialed, and any other information that it is customary and/or useful to display in conjunction with the various timekeeping and radiotelephone functions the apparatus is capable of performing.

Adjacent to display 122 is an array of push buttons 124. Buttons 124 are used by the user of the apparatus to control various timekeeping and radiotelephone functions of the apparatus. For example, buttons 124 may be used to set the time, to set an alarm time, to enable an alarm function, to stop an alarm, to enter a telephone number in order to place a radiotelephone call to that number, to "pick up" or receive an incoming radiotelephone call, to terminate a radiotelephone connection that is no longer needed, etc.

Below buttons 124, as typically viewed by the user, is a structure 130 which includes two radiotelephone voice ports 132 and 134. Voice port 132 is a microphone, an opening behind which a microphone is located, or part of an acoustic coupling to a microphone located elsewhere in the apparatus. Voice port 134 is a speaker, a structure within which a speaker is located, or part of an acoustic coupling to a speaker located elsewhere in the apparatus. Voice port 134 is normally held resiliently in a recess in structure 130 as shown in FIGS. 2 and 3. However, when it is desired to use the apparatus as a radiotelephone, voice port 134 can be pulled out of the above-mentioned recess on a flexible tether member 136 as shown in FIG. 1. The usable length of tether member 136 is preferably great enough to permit voice port 134 to be placed in or near the user's ear while the user holds his or her wrist and the remainder of the apparatus on the wrist so that voice port 132 is adjacent the user's mouth. Accordingly, the user can conveniently speak into voice port 132 while listening to received voice via voice port 134.

Tether member 136 preferably includes an antenna wire for the radiotelephone circuitry of apparatus 100 so that when voice port 134 is pulled out to deploy that port from the remainder of the apparatus, the antenna wire is elongated and becomes more effective as an antenna. Tether 136 may also include wires for conveying electrical signals to a speaker transducer in voice port 134. Alternatively, the speaker transducer may be in the apparatus which remains on the user's wrist, and tether member 136 may include an acoustic coupler (such as a hollow plastic tube) from the transducer to voice port 134.

Tether member 136 is preferably retracted into structure 130 on a reel (not shown) inside that structure. This tether dispensing and retracting structure may be constructed and operate like a conventional window shade mechanism, or it may be constructed and operate like a conventional automatic power cord retractor for a vacuum cleaner. Thus any length of tether member 136 can be pulled out and will remain out as long as desired. But when it is desired to retract tether member 136, a spring turns a reel to pull the tether member back into structure 130. This retraction operation may be initiated by a momentary further extension of the tether member (as in the case of a window shade type mechanism) or by manipulating structure 130 to disengage a brake and cause retraction to occur (as in the case of a power cord type retractor). For example the brake may be released when the user presses in on structure 130.

The timekeeping and radiotelephone circuitry of apparatus may be entirely conventional (e.g., as shown in the above-mentioned Olsen patent (incorporated by reference herein) or as shown in any of the other patents mentioned above).

A second illustrative embodiment of the invention is shown in FIGS. 4–8. As shown in these FIGS., wristwatch radiotelephone 200 includes a strap structure 210 that may be similar to above-described strap structure 110. Apparatus 200 also includes a combined wristwatch structure and radiotelephone structure 220 that may be generally similar to above-described structure 120. Thus structure 220 includes display 222 and push buttons 224 that may be similar, respectively, to above-described elements 122 and 124.

Figure 4:
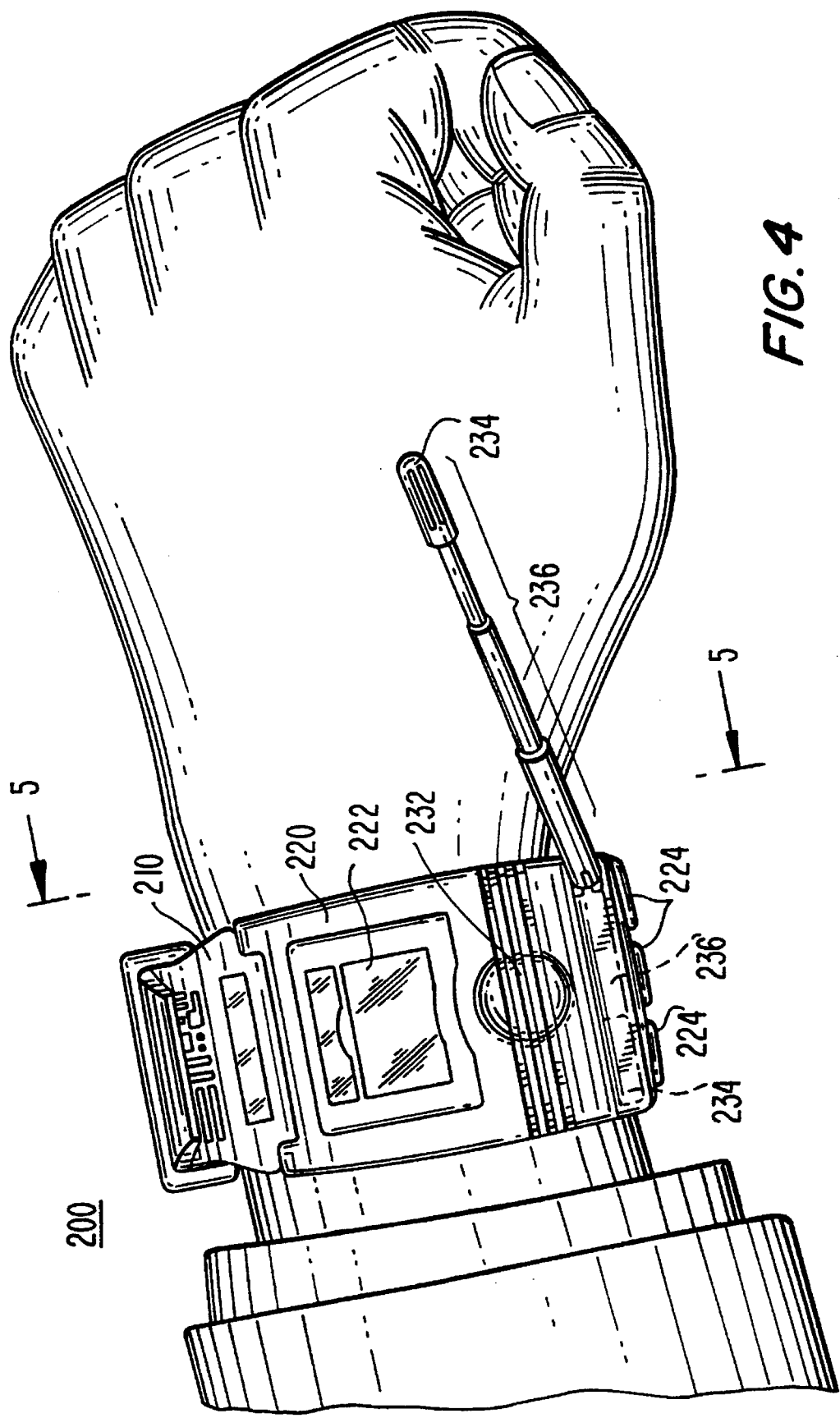
FIG. 4 is an elevational view of a second illustrative embodiment of the invention.

As can be seen in FIG. 4, a first voice port 2 is located on structure 220 below display 222, as the apparatus is usually viewed by the user. Below that, a second voice port 234 is located on the free end of telescoping structure 236. The other end of structure 236 is pivotally connected to structure 220 at 226. In addition to being pivotable, the connection 226 of structure 236 to structure 220 can be a swivel connection if desired.

Figure 5:
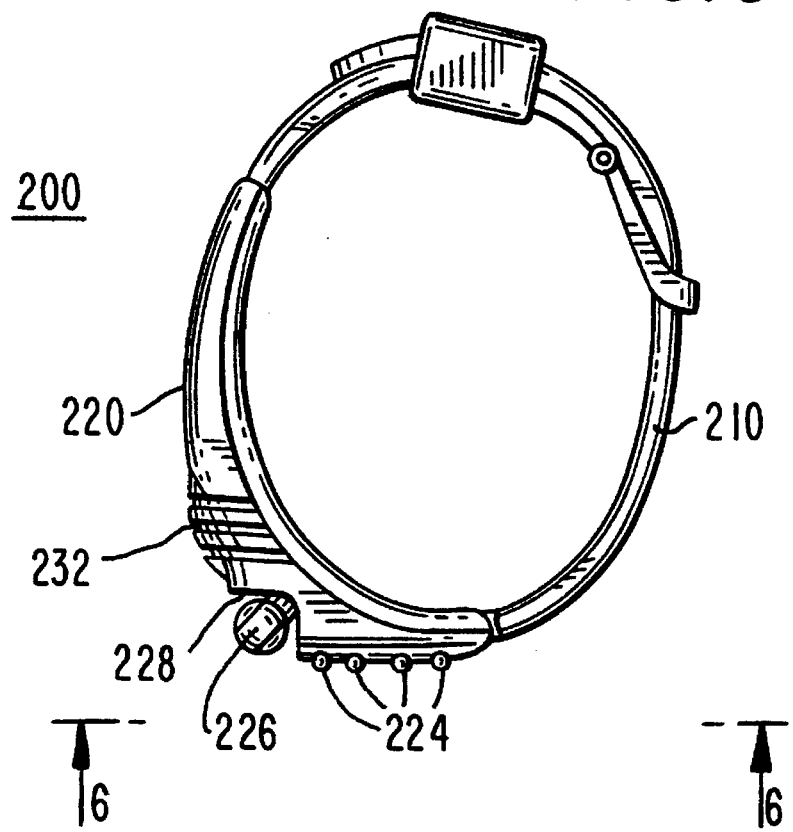
FIG. 5 is an elevational view taken generally along the line 5—5 in FIG. 4.
Figure 6:
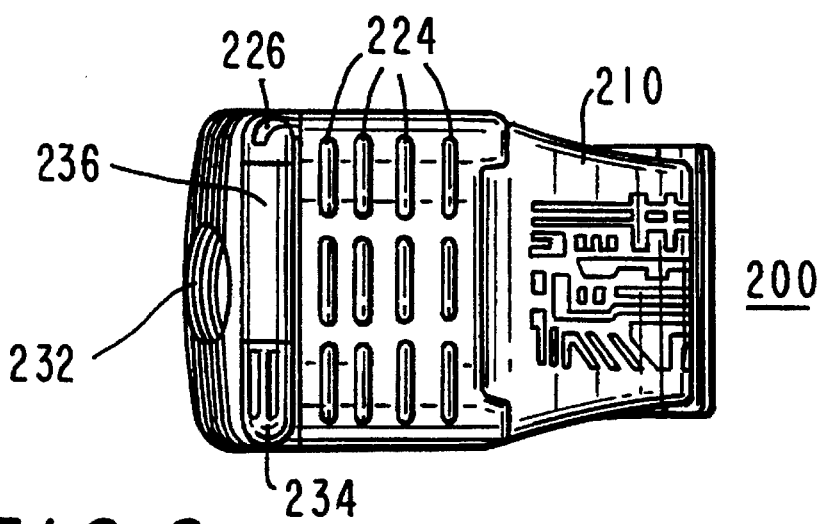
FIG. 6 is an elevational view taken generally along the line 6—6 in FIG. 5.
Figure 7:
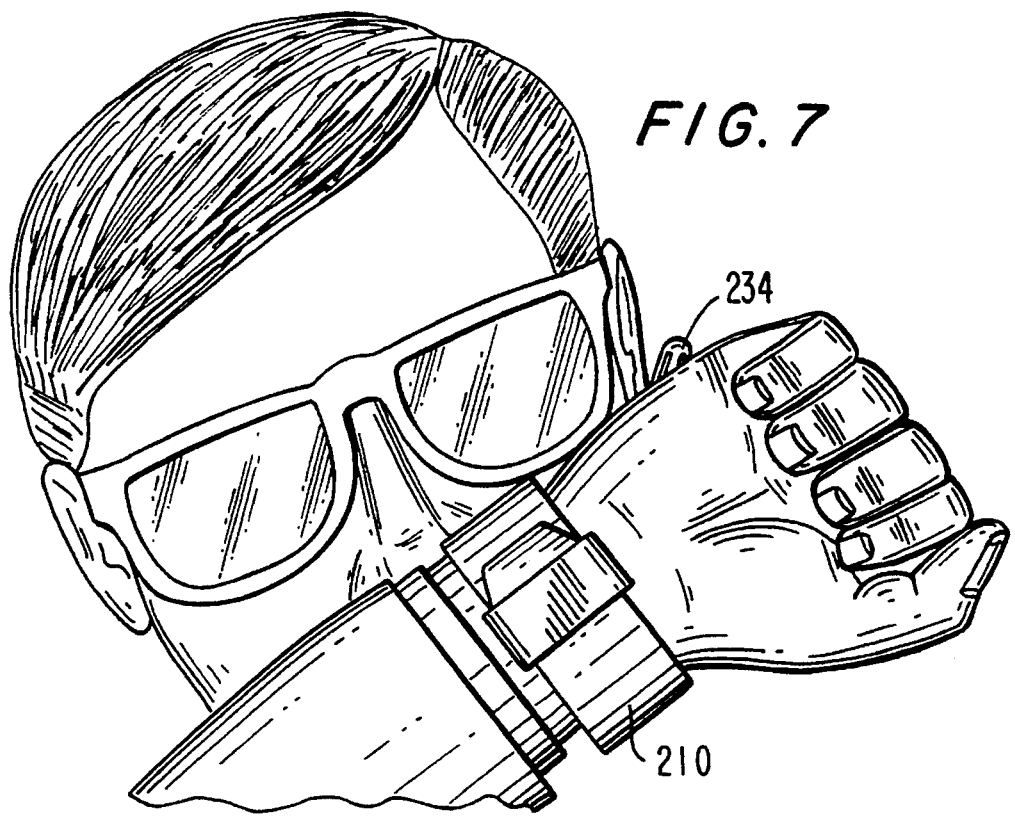
FIG. 7 is an elevational view illustrating radiotelephone use of the apparatus of FIGS. 4–6.
Figure 8:
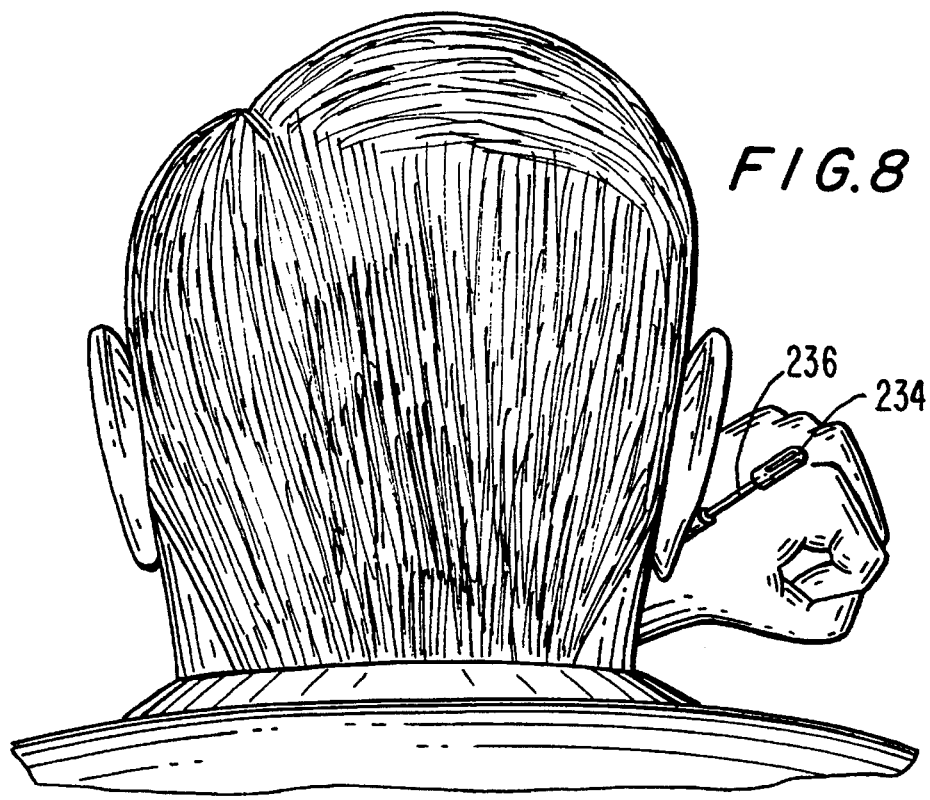
FIG. 8 is another elevational view of what is shown in FIG. 7.

During use of apparatus 200 as a wristwatch, telescoping structure 236 is typically collapsed and pivoted so that it is largely received in a recess 228 in structure 220 as shown in dotted lines in FIG. 4 and in full detail in FIGS. 5 and 6. On the other hand, when it is desired to use apparatus 200 as a radiotelephone, voice port 234 is deployed out from the remainder of the apparatus by pivoting member 236 out and telescopically extending it as shown in solid line form in FIG. 4 and also in FIGS. 7 and 8. This separates voice ports 232 and 234 sufficiently from one another so that one can be placed near the user's mouth while the other is simultaneously placed near the user's ear as shown in FIGS. 7 and 8. Moreover, this is done without any need to remove apparatus 200 from the user's wrist. To return the apparatus to wristwatch use, member 236 is telescopically collapsed and then pivoted back into recess 228.

In addition to providing telescopic support for voice port 234, member 236 may be or include a telescopic antenna for the radiotelephone circuitry of apparatus 200. As in the case of voice port 134, member 236 may be or include electrical or acoustic connections to voice port 234 from the remainder of apparatus 200.

Other aspects of apparatus 200 that are not discussed above may be similar to corresponding aspects of apparatus 100.

A third illustrative embodiment of the invention is shown in FIGS. 9–12. In this embodiment wristwatch radiotelephone 300 again includes a strap structure 310 that may be similar to above-described strap structure 110 or 210. Combined wristwatch structure and radiotelephone structure 320 may also be generally similar to above-described structure 120 or 220. Thus again structure 320 includes a display 322 and an array of push buttons 324 respectively similar to above-described display 122 or 222 and buttons 124 or 224. Apparatus 300, however, illustrates the principle that structure 320 may be located on the inside of the wrist (i.e., adjacent the user's palm) rather than on the outside of the wrist as shown in connection with the first two embodiments.

Voice port 334 is located on structure 320 above display 322, as the apparatus is usually viewed. Voice port 332 is located on the free end of a folding structure 336, the other end of which is secured to structure 320 at 326. If desired, connection 326 may be a sliding connection which allows folding structure 336 to slide part way off structure 320 in the same general direction that folding structure 336 extends when it is unfolded. This sliding feature is another form of the telescoping that is used in the second embodiment. (By the same token, the pivoting or swiveling of structure 236 in the second embodiment is another form of the folding used in the embodiment presently being discussed.)

Figure 9:
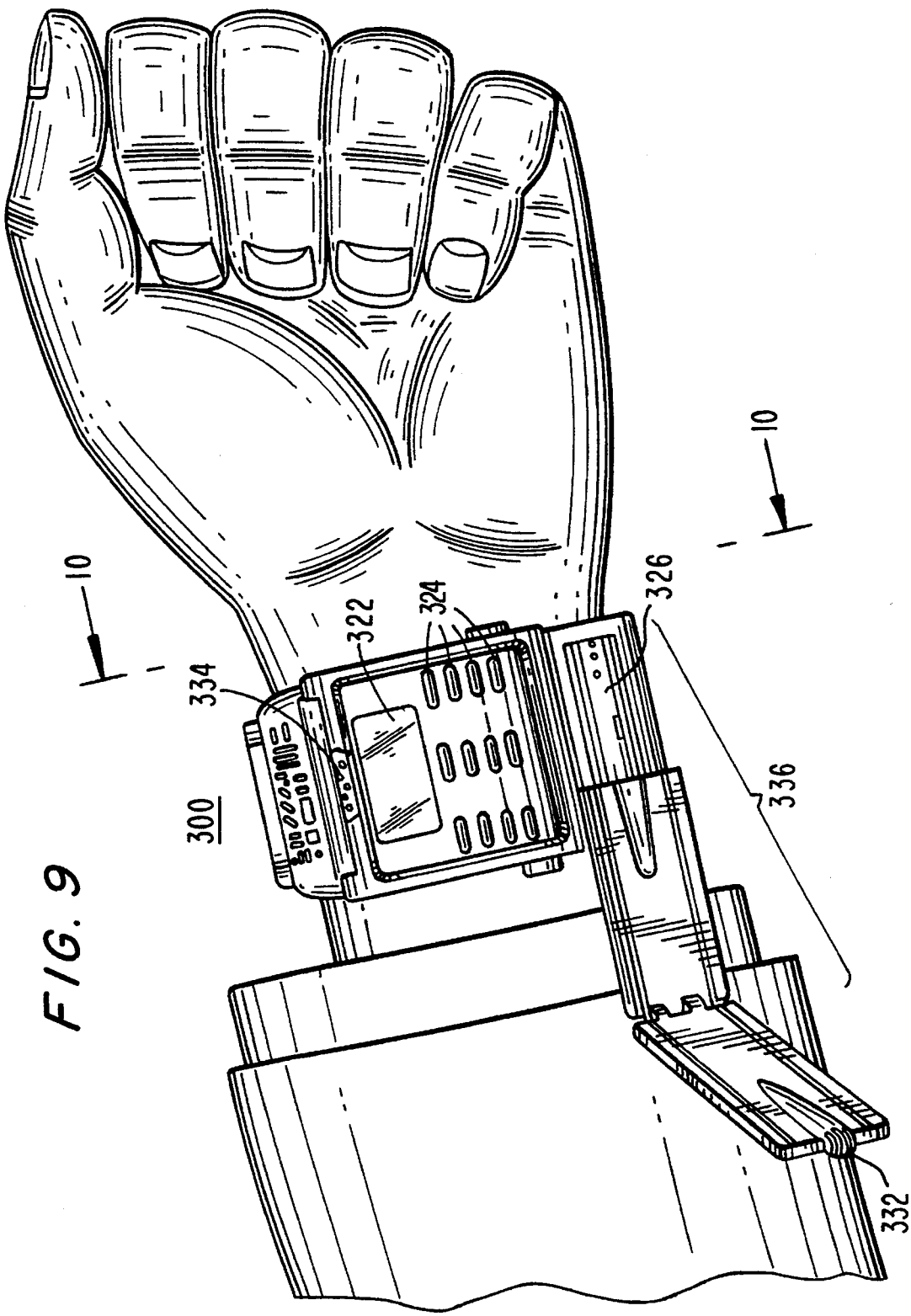
FIG. 9 is an elevational view of a third illustrative embodiment of the invention.
Figure 10:
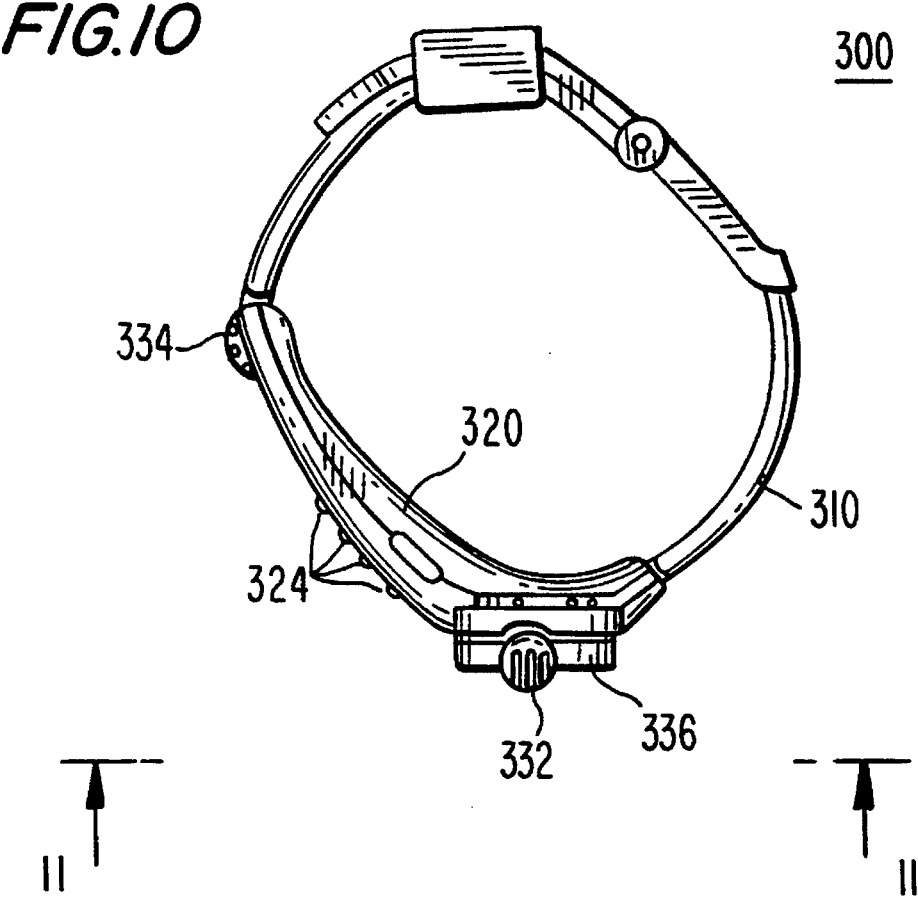
FIG. 10 is an elevational view taken generally along the line 10—10 in FIG. 9, but showing a different operating condition of the apparatus than is shown in FIG. 9.
Figure 11:
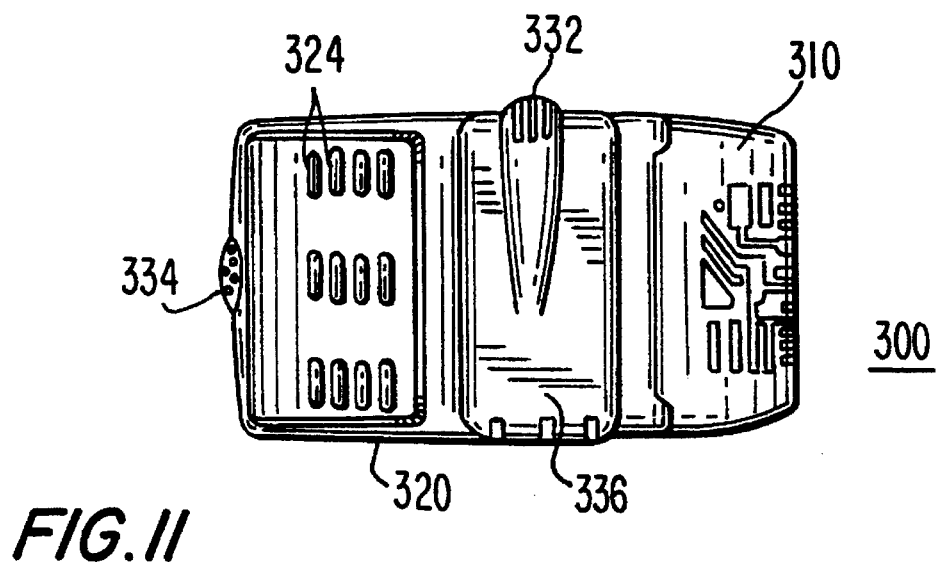
FIG. 11 is an elevational view taken along the line 11—11 in FIG. 10.
Figure 12:
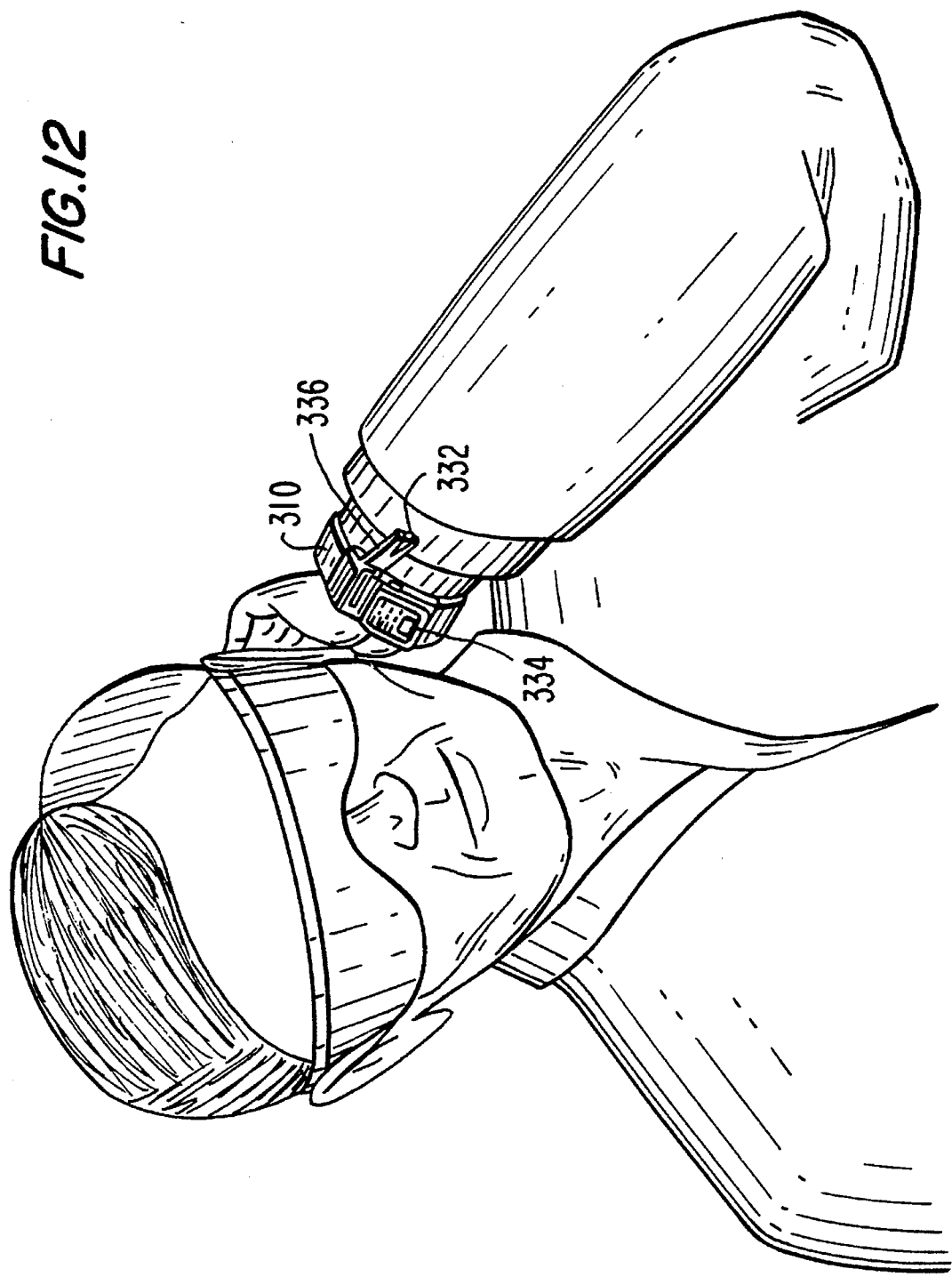
FIG. 12 is an elevational view illustrating radiotelephone use of the apparatus of FIGS. 9–11.

When apparatus 300 is being used as a wristwatch, folding structure 336 is folded in on itself and slid to a position in which it does not overhang the sides of structure 320. This is the condition of the apparatus that is shown in FIGS. 10 and 11. On the other hand, when apparatus 300 is to be used as a radiotelephone, folding structure 336 is slid relative to structure 320 and unfolded as shown in FIGS. 9 and 12. This greatly increases the separation between voice ports 332 and 334, and also facilitates simultaneous placement of those ports near the user's mouth and ear, respectively. As FIG. 12 shows, this can be done without removing apparatus 300 from the user's wrist. To return the apparatus to wristwatch use, folding structure 336 is folded in on itself and slid back to the position shown in FIGS. 10 and 11.

In addition to providing folding support for voice port 332, folding structure 336 may be or include a folding antenna for the radiotelephone circuitry of apparatus 300. Folding structure 336 may also be or include electrical or acoustic coupling between voice port 332 and the remainder of the apparatus.

The embodiment of FIGS. 9–12 illustrates the point that the voice port which is deployed from the remainder of the apparatus may be the voice input port 332 rather than the voice output port as is the case in the previously described embodiments.

It will be noted that in the depicted preferred embodiments, simultaneous use of the input and output voice ports is facilitated by having the deployment of one of the voice ports include a component of displacement which is generally parallel to the longitudinal axis of the wrist or arm. (Stated another way, the apparatus substantially circles the wrist in a plane which is substantially perpendicular to the longitudinal axis of the user's wrist or arm. The above-mentioned component of displacement of the deployable voice port is then transverse to this plane.) This kind of displacement may not be necessary in every case, but it is helpful in the embodiments depicted here.

It will be understood that the foregoing is only illustrative of the principles of the invention, and that various modifications can be made by those skilled in the art without departing from the scope and spirit of the invention. For example, although in each of the depicted embodiments only one of the voice ports is deployed from the remainder of the apparatus, both voice ports could be deployed to some degree if desired.

The invention claimed is:

1. Wristwatch radiotelephone apparatus comprising:

a strap structure adapted to at least partly encircle a wrist of a user of the apparatus, said strap structure lying in a plane which is transverse to the longitudinal axis of said wrist;

a combined watch and radiotelephone structure mounted on said strap structure for viewing and operation by said user and for use by said user to transmit the user's voice by radio transmission from said apparatus and to receive via radio transmission another person's voice which said apparatus renders audible by the user;

said combined watch and radiotelephone structure including a voice input port for receiving said user's voice and a voice output port for outputting said other person's voice as said apparatus has rendered it audible, at least one of said ports being deployable from said combined watch and radiotelephone structure but remaining secured to said combined watch and radiotelephone structure during such deployment, said deployment being from a first position in which said at least one of said ports is relatively close to the other of said ports to a second position in which said at least one of said ports is relatively far from said other port, said second position facilitating simultaneous placement of one of said ports adjacent the user's mouth and a second of said ports adjacent an ear of the user without removal of said apparatus from said wrist.

2. The apparatus defined in claim 1 wherein said at least one port is relatively close to said plane in said first position and relatively far from said plane in said second position.

3. The apparatus defined in claim 1 further comprising:

a flexible tether member for connecting said at least one port to said second port.

4. The apparatus defined in claim 3 further comprising:

a tether dispenser for selectively alternately dispensing and retracting said tether member.

5. The apparatus defined in claim 4 wherein said at least one port is placed in said second position when said tether dispenser dispenses said tether member.

6. The apparatus defined in claim 3 wherein said at least one port includes an electro-acoustic transducer, and wherein said tether member includes an electrical conductor for electrically connecting said transducer to other electrical circuitry in said apparatus.

7. The apparatus defined in claim 3 wherein said tether member includes an antenna for said combined watch and radiotelephone structure.

8. The apparatus defined in claim 1 further comprising:

a telescoping structure having a first end which is secured to said combined watch and radiotelephone structure and a second end which moves away from said first end when said telescoping structure is telescopically extended and which moves toward said first end when said telescoping structure is telescopically retracted, said at least one of said ports being disposed on said telescoping structure adjacent said second end.

9. The apparatus defined in claim 8 wherein said at least one of said ports is placed in said second position by telescopically extending said telescoping structure.

10. The apparatus defined in claim 8 wherein said telescoping structure is pivotable relative to said combined watch and radiotelephone structure adjacent to said first end.

11. The apparatus defined in claim 10 wherein said telescoping structure includes a telescoping antenna for said combined watch and radiotelephone structure.

12. The apparatus defined in claim 1 further comprising:

a folding structure having a first end which is secured to said combined watch and radiotelephone structure and a second end which is relatively close to said first end when said folding structure is folded and which is relatively distant from said first end when said folding structure is unfolded, said at least one of said ports being disposed on said folding structure adjacent said second end.

13. The apparatus defined in claim 12 wherein said folding structure is slidably secured relative to said combined watch and radiotelephone structure adjacent said first end, said folding structure being thereby slidable relative to said combined watch and radiotelephone structure along an axis which is substantially perpendicular to said plane.

14. The apparatus defined in claim 12 wherein said folding structure includes a folding antenna for said combined watch and radiotelephone structure.

15. Wristwatch radiotelephone apparatus comprising:

a strap structure adapted to at least partly encircle a wrist of a user of the apparatus, said strap structure lying in a plane which is transverse to the longitudinal axis of said wrist;

a watch structure mounted on said strap structure for viewing and operation by said user;

a radiotelephone structure mounted on said strap structure for use by said user to transmit the user's voice by radio transmission from said apparatus and to receive via radio transmission another person's voice which said apparatus renders audible by the user, said radiotelephone structure including a voice input port for receiving said user's voice and a voice output port for outputting said other person's voice as said apparatus has rendered it audible, at least one of said ports being deployable from a first position in which it is relatively close to the other of said ports to a second position in which it is relatively far from said other port, said second position facilitating simultaneous placement of one of said ports adjacent the user's mouth and a second of said ports adjacent an ear of the user without removal of said apparatus from said wrist;

a flexible tether member for connecting said at least one port to said second port; and a tether dispenser for selectively alternately dispensing and retracting said tether member.

16. The apparatus defined in claim 15 wherein said at least one port is placed in said second position when said tether dispenser dispenses said tether member.

17. Wristwatch radiotelephone apparatus comprising:

a strap structure adapted to at least partly encircle a wrist of a user of the apparatus, said strap structure lying in a plane which is transverse to the longitudinal axis of said wrist;

a watch structure mounted on said strap structure for viewing and operation by said user;

a radiotelephone structure mounted on said strap structure for use by said user to transmit the user's voice by radio transmission from said apparatus and to receive via radio transmission another person's voice which said apparatus renders audible by the user, said radiotelephone structure including a voice input port for receiving said user's voice and a voice output port for outputting said other person's voice as said apparatus has rendered it audible, at least one of said ports being deployable from a first position in which it is relatively close to the other of said ports to a second position in which it is relatively far from said other port, said second position facilitating simultaneous placement of one of said ports adjacent the user's mouth and a second of said ports adjacent an ear of the user without removal of said apparatus from said wrist; and a telescoping structure having a first end which is secured to said strap structure and a second end which moves away from said first end when said telescoping structure is telescopically extended and which moves toward said first end when said telescoping structure is telescopically retracted, said at least one of said ports being disposed on said telescoping structure adjacent said second end.

18. The apparatus defined in claim 17 wherein said at least one of said ports is placed in said second position by telescopically extending said telescoping structure.

19. The apparatus defined in claim 17 wherein said telescoping structure is pivotable relative to said strap structure adjacent to said first end.

20. The apparatus defined in claim 19 wherein said telescoping structure includes a telescoping antenna for said radiotelephone structure.

* * * * *